Nov. 16, 1948.  W. I. JONES  2,453,990
HOLDER FOR FASTENER ATTACHING MEANS
Filed Jan. 26, 1946
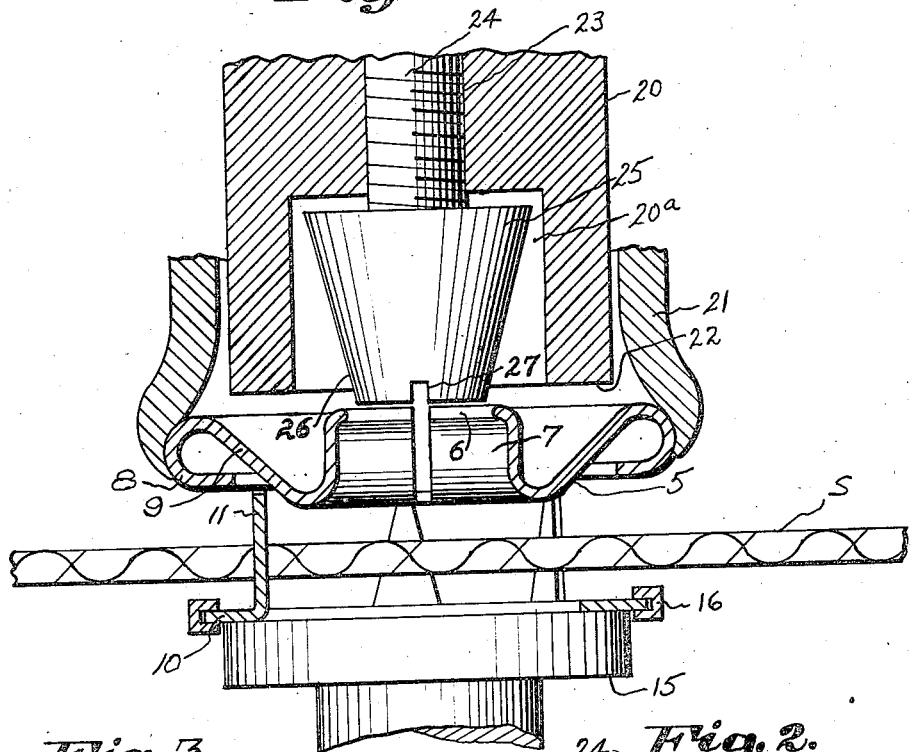
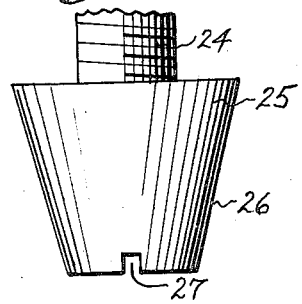
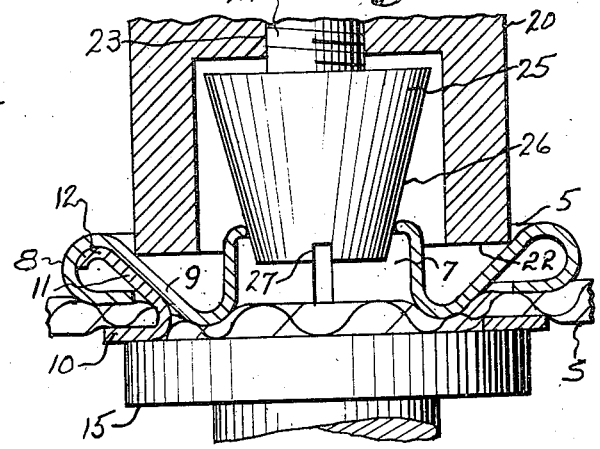
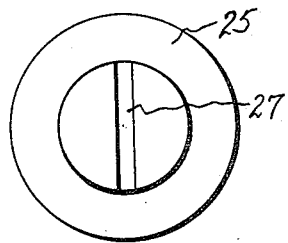
Inventor
Walter I. Jones.
By John Todd
Attorney Patented Nov. 16, 1948

2,453,990

UNITED STATES PATENT OFFICE 2,453,990

HOLDER FOR FASTENER ATTACHING MEANS

Walter I. Jones, Belmont, Mass., assignor to United-Carr Fastener Corporation, Cambridge, Mass., a corporation of Massachusetts Application January 26, 1946, Serial No. 643,814

1 Claim. (Cl. 218—6)

The present invention relates to improvements in fastener attaching means and tools and aims generally to improve existing means and tools for applying snap fastener socket members and the like to a support.

More particularly the invention relates to fastener attaching tools for attaching fastener sockets to a support, so that the resilient socket part will have the desired snap action with the stud part with which it is associated in use.

Many types of snap fastener sockets, such as those of the clinch ring type, are usually applied and attached to a flexible support by a press having relatively movable members, for example a punch and a platen or die, disposed on opposite sides of the support. In such presses the stud-receiving socket is usually engaged by a portion of the punch and the clinch ring is engaged by the platen or die, and the two are forced together to interlocking engagement by relative closing movement of the punch and die. The clinch ring of such fastener is frequently pronged, and must be applied to the socket member with sufficient pressure to cause the prongs to penetrate the support and be clinched by the anvil portion of the socket within the retainer ring portion thereof.

Snap fastener socket members, when applied to a support, should have a desired or predetermined gripping engagement with the cooperating stud fastener member, for satisfactory use. Such socket members are manufactured from very thin sheet material, such as steel, aluminum, brass or thermo-setting thermo-plastic material, which because of the nature of the material and because of the commercial difficulties encountered in forming it to uniform thickness results in fastener sockets of varying degrees of resilience and varying degrees of cooperating snap fastener action with a stud. Also, variations in the nature, thickness and type of support material, to which the socket members are attached will vary to some degree the snap fastener action of the socket with the stud member.

One of the primary objects of the present invention is the provision of fastener socket-attaching means or tools, which may be incorporated in existing attaching machines, either of the automatic or manually operated type, which means are adjustable to apply fastener sockets to support material to produce a series of uniformly resilient socket members having a desired or predetermined degree of snap fastener gripping action with cooperating studs.

A further object of the invention is the provision of attaching means having a socket-engaging surface and a stud aperture-engaging wall with means for relatively adjusting the parts so as to vary the diameter of the stud aperture-engaging wall in the plane of the socket-engaging surface.

A still further object of the invention is the provision of a socket-attaching tool having an axially adjustable tapered wall for engagement with the annular inner edge or wall of the stud-receiving opening of the socket, so that the pressure on the annular edge around the stud-receiving opening can be varied as the component socket parts are clenched, and thus control the snap fastening action to a desired tension.

A still further object of the invention is the provision of a socket-attaching punch which will be of simple construction and capable of ready adjustment to effect a desired snap fastening action with a cooperating stud.

The above and other objects of the invention will be apparent to those skilled in the art from a consideration of the accompanying drawings and annexed specification illustrating and describing a preferred embodiment of the invention.

In the drawings:

Fig. 1 is an enlarged sectional view of the component parts of a conventional fastener socket and the essential parts of the attaching member shown in position ready to set or attach the fastener;

Fig. 2 is an enlarged vertical sectional view similar to Fig. 1 showing the parts in their positions with the fastener socket parts attached to a support;

Fig. 3 is a side elevation of the adjustable pin of the socket punch or setting die according to the invention; and Fig. 4 is a bottom plan view of the adjustable pin shown in Fig. 3.

Referring to the drawings, there is illustrated one preferred embodiment of the invention suitable for applying snap fastener socket members of the clinch ring type to a support S, which may be of any desired material such as paper, textile fabric, rubber, leather or the like.

The socket member 5 herein illustrated may be of the type having a central stud-receiving aperture 6 formed by a plurality of upstanding resilient fingers 7 and joined to a retainer ring 8 by an anvil portion 9. The socket member 5 is secured to the support S by means of a clinch ring or plate 10, disposed on the opposite side of the support S from the socket member 5 and having prongs 11 adapted to penetrate the support material and be curled by engagement with the anvil portion 9 into a bead 12 within the retainer ring 8 (Fig. 2).

The socket member 5 and clinch ring 10 may be applied to the support by any suitable type of machine employing relatively movable pressing members, for example a manually operated press or by an automatic fastener attaching machine, such as shown and described in the U. S. patent of Lester N. Hayden No. 1,944,510, dated January 23, 1934. In machines of the latter type, the component parts of the fastener member, such as the parts 5 and 10, are fed to and positioned with respect to relatively movable die 15 and punch 20 and are held in operative position relative thereto by jaw members 16 and 21, respectively, as will be clearly understood by reference to said patent.

According to the present invention the punch 20 for engaging and controlling the socket member 5 is movable vertically and is recessed at its lower end as at 20ª, providing an annular socket-engaging surface 22. The inner end of the recess is counterbored and threaded as at 23 to receive a threaded shank 24 of a punch pin 25, the body of which is disposed within the recess 20ª. The body 25 is of multi-diameter cross-section and preferably this is effected by tapering the outer walls 26 toward the terminal end of the pin, and advantageously the taper of the walls is substantially 25 degrees. The lower or terminal end of the pin 25 may be shaped, as by a slot 27 to receive a tool, for example a screw driver, to rotate the pin 25 relative to the punch 20, and adjust the taper walled body axially in the recess 20ª.

In operation, the punch is moved toward the socket member 5 until the socket member is engaged by the socket-engaging face 22 of the punch, which, in the illustrated embodiment, may be between the resilient fingers 7 and anvil portion 9 of the socket member. The pin 25 is preferably adjustably positioned in the recess 20ª so that the terminal end enters the stud-receiving opening 6 of the socket and engages the inner edges of the fingers 7 during the final setting pressure between the punch 20 and die 15. This prevents distortion of the fingers 7 during the setting or attaching operation.

By adjusting the punch pin body 25 axially of the punch 20, the diameter or cross sectional area of the pin body relative to the plane of the support-engaging surface 22 may be selectively varied to suit particular existing conditions such as the resilience and springiness of the fingers 7 or the stiffness or flexibility of the material of the support S.

The invention is not to be restricted to the particular details of construction shown and described as the scope thereof is best defined in the appended claim.

I claim:

A snap fastener socket attaching means comprising a plunger having an annular portion at one end, a coaxial pin having a regular tapering frusto-conical head in combination with said plunger and extending with its small end beyond said annular portion, and means for adjusting the position of said pin axially of said plunger to selectively vary the plane of maximum diameter of said pin beyond the plane of the end of said annular portion.

WALTER I. JONES.

REFERENCES CITED

The following references are of record in the file of this patent:

UNITED STATES PATENTS

| Number | Name | Date |
| --- | --- | --- |
| 530,657 | Richardson | Dec. 11, 1894 |
| 1,873,890 | Holmes | Aug. 23, 1932 |
| 2,361,688 | Huelster | Sept. 31, 1944 |
| 2,383,330 | Michael | Aug. 21, 1945 |